United States Patent [19]

Klebe et al.

[11] 4,156,039

[45] May 22, 1979

[54] SODIUM PERCARBONATE PARTICLES (A)

[75] Inventors: Hans Klebe, Rheinfelden; Gerd Knippschild, Wehr; Hubert Schuster, Karsau-Beuggen, all of Fed. Rep. of Germany

[73] Assignee: Deutsche Gold- und Silber-Scheideanstalt vormals Roessler, Frankfurt, Fed. Rep. of Germany

[21] Appl. No.: 837,262

[22] Filed: Sep. 27, 1977

[30] Foreign Application Priority Data

Nov. 11, 1976 [DE] Fed. Rep. of Germany ....... 2651442
Mar. 19, 1977 [DE] Fed. Rep. of Germany ....... 2712139

[51] Int. Cl.$^2$ .......................... B05D 7/24; B05D 7/00
[52] U.S. Cl. .................................... 427/215; 252/99; 252/186; 427/214

[58] Field of Search ................. 252/99, 186; 427/214, 427/215; 428/402, 403

[56] References Cited

U.S. PATENT DOCUMENTS 3,979,318  9/1976  Tokiwa et al. .................... 252/99 X

*Primary Examiner*—Mayer Weinblatt
*Attorney, Agent, or Firm*—Cushman, Darby & Cushman

[57] ABSTRACT

There are prepared sodium percarbonate particles comprising a sodium percarbonate nucleus encased in a layer of dehydrated sodium perborate or a mixture of dehydrated sodium perborate and sodium silicate with or without additional water binding materials chemically inert to sodium percarbonate and dehydrated sodium perborate.

24 Claims, No Drawings

SODIUM PERCARBONATE PARTICLES (A)

BACKGROUND OF THE INVENTION

The invention concerns a new type of sodium percarbonate particle.

The use of sodium percarbonate as a bleaching agent alone or in washing agents is of increasing interest since the washing process is increasingly carried out at lower temperatures down to as low as room temperature.

In contrast to sodium perborate tetrahydrate ($NaBO_2 \cdot H_2O_2 \cdot 3H_2O$) (theoretical active oxygen=10.4%) sodium percarbonate has the advantage of greater solubility at 20° C. and a greater active oxygen content (theoretical active oxygen=15.3%). However, it has the severe disadvantage that it has very little storage stability in a non-dry atmosphere. Thus, the slight amounts of moisture which are present already in the atmosphere and/or in the washing agent are sufficient to bring about the decomposition of the percarbonate.

Especially in warmer zones, where a higher temperature prevails, the decomposition once initiated progresses rapidly.

This problem was known early and therefore for a long time there have been efforts to increase the storage stability of sodium percarbonate in various ways.

Thus, there has been attempted the obtaining of increased stability with the help of aerosols such as silica aerosols (German Pat. No. 870,092).

Also, by the addition of benzoic acid the stability should be increased (German OS No. 1 767 796).

The additives were added either during the production of the percarbonate or in connection with the production of the finished product.

It has already been tried to obtain a stable product by using stabilizers and complex formers which eliminate the impurities of the added soda or the impurities which appear during the process. (German OS No. 2 234 135)

Another idea which has been tried repeatedly is to protect the percarbonate particles by encasing with a protective layer before the decomposition influences take effect. Thus, according to French Pat. No. 893,115 there have been used natural or synthetic resins, or according to German OS No. 2 511 143 polyethylene glycol, or there have been used copolymers in which one of the monomers was vinyl chloride or vinylidene chloride (German OS Nos. 2 402 392 and 2 403 393).

There has also been proposed encasing with a sodium silicate solution (British Pat. No. 174,891) or a mixture of alkali or alkaline earth silicate and silico-fluoride (German OS No. 2 511 143) or an aqueous sol of silicates (Belgian Pat. No. 820,741).

However, it is indicated that the stability is only retained if the storage is in dry air at 20° C.

In any case, however, whatever the reason there was always present so much moisture that the decomposition of the percarbonate began, the storage temperature increased due to the heat of decomposition which accelerated the further decomposition of the percarbonate as did the water obtained from the hydrogen peroxide decomposition.

Thus, there occur active oxygen losses of 40% and more within 15 days if the stability test is carried out at 40° C. and 80% relative air humidity (German OS No. 2 511 143).

The object of the invention therefore is the production of a percarbonate relatively stable in a moist and warm environment, whose loss of activity in the same type of environment is still comparatively small and which retains its good speed of solubility after the stabilization.

SUMMARY OF THE INVENTION

It has now been found that this object can be attained by a sodium percarbonate particle which consists of a sodium percarbonate nucleus and a jacket or encasing layer of dehydrated sodium perborate.

This sodium percarbonate particle generally contains 13–15.5% of active oxygen. However, there are included in the particles of the invention also those with a lower active oxygen content down to 11% for example. This is of interest under favorable storage conditions, i.e., lower temperatures and less air moisture and at higher washing temperatures of 60° C. and above.

Furthermore, it was found that a sodium percarbonate particle whose percarbonate nucleus is surrounded by a jacket or encasing layer of dehydrated sodium perborate and a sodium silicate is particularly stable.

In further development of this particle it has also been found that a sodium percarbonate particle is also stable in which the encasing layer also contains in addition to the dehydrated sodium perborate and sodium silicate further water binding materials chemically inert to sodium percarbonate and dehydrated sodium perborate.

This type of sodium percarbonate particle generally contains 8–15% of active oxygen.

The sodium percarbonate particles of the invention depending on the apparatus used for their production have a spherical or nearly spherical shape and are present in a size from dust up to 2 mm.

It goes without saying there are also included as suitable percarbonate particles those which depending on the degree of purification of the starting components likewise contain these impurities.

As sodium percarbonate there can be used those produced by known processes, either directly from the process of production with still adhering mother liquor, or dry sodium percarbonate, in any case in a particle size from dust to 1.00 mm.

As "dehydrated sodium perborate" there are included those which based on the formula $NaBO_2 \cdot H_2O_2 \cdot 3H_2O$ for sodium perborate tetrahydrate contain less than 54 grams of water per mole. Such a perborate can be partially or entirely dehydrated. The greater the perborate is dehydrated the better is the adherence to the wet sodium percarbonate. There has proven favorable a dehydrated sodium perborate with at least 15% active oxygen content. Particularly suited are perborates with 15.2–15.8% active oxygen.

The dehydrated sodium perborate is recovered by overdrying the tetrahydrate according to known processes, e.g., according to German Pat. No. 970,495 which shows preparing sodium perborate monohydrate.

As "tetrahydrate" there is meant the compound corresponding to the above formula $NaBO_2 \cdot H_2O_2 \cdot 3H_2O$.

The dehydrated sodium perborate is suitably added as dust.

As sodium silicate there can be used for example sodium metasilicate ($Na_2SiO_3$), sodium disilicate ($Na_2Si_2O_5$) and sodium ortho silicate ($Na_4SiO_4$). A preferred silicate is sodium metasilicate or dissolved silicate, e.g. in the form of waterglass. An amount of sodium silicate corresponding to 0.1–1% $SiO_2$ in the sodium percarbonate particle is normally sufficient. For particularly high stability requirements the sodium percarbonate particles can even contain up to 5 weight % $SiO_2$.

However, it also is possible to observe a stabilization effect with an amount of silicate corresponding to 0.05 weight % $SiO_2$. A favorable amount for the $SiO_2$ content of the particle is 0.5–1.0 weight %.

Sodium perborate and sodium silicate can be mixed with each other and in this form encase the percarbonate; however, this mixture should be as homogeneous as possible.

It was further found that the sodium percarbonate particles of the invention can be produced if the sodium percarbonate wet with water is covered with dehydrated perborate.

Or, such particles can be produced if in the co-use of sodium silicate, the percarbonate particle either is wet with an aqueous sodium silicate solution and thereupon coated with dehydrated perborate or water wet percarbonate is surrounded by a mixture of dehydrated perborate and sodium silicate.

As already stated the sodium percarbonate can carry along the necessary wetting water from the process of production (as mother liquid). Otherwise, it must be wet with water before the coating (with dehydrated sodium perborate).

With a content of sodium silicate in the perborate coating of the percarbonate particles wetting is either, according to the above description, or can also be only with water or with aqueous sodium silicate solution.

This procedure can be carried out in known manner and is not critical. Preferably the water or the aqueous sodium silicate solution is sprayed on.

In all cases, even in using an aqueous sodium silicate solution, there should always be present only sufficient water that the sodium percarbonate particles present are wet and the most homogeneous coating with dehydrated sodium perborate or dehydrated sodium perborate and sodium silicate or such a mixture and the inert water binding agent can take place.

The coating is done by known processes such as careful dusting on by hand with a shovel, careful dusting with simultaneous movement or dosing via a trough with simultaneous motion, etc.

In the apparatus used, see the examples, the amount of water sprayed on is, e.g., about 4% of the added sodium percarbonate.

If the apparatus permits an intensive wetting of the percarbonate particles, a higher amount of water is used. If the apparatus employed only permits a lesser wetting then there must be used a lesser amount of water than about 4%. This can be readily ascertained by a hand experiment.

This situation is substantially the same of sodium silicate with or without the inert water binding agent is also used.

The sequence "Wetting with water or aqueous sodium silicate solution and coating with dehydrated sodium perborate or dehydrated sodium perborate, and sodium silicate or with dehydrated sodium perborate and water binding agent" or with dehydrated sodium perborate, sodium silicate and water binding agent can be carried out one or more times, according to what degree of encasing is desired, i.e., how thick should the jacket be.

After attaining the desired degree of encasement, the product present can again be wet with water or wet in the presence of sodium silicate with aqueous sodium silicate, see Examples 3 and 6.

Finally, a complete encasing with dehydrated sodium perborate or additionally with sodium silicate with or without inert dehydrating agent can be attained.

The desired strength is dependent upon the purpose of use. The thus produced sodium percarbonate particles finally can be completely or partially dehydrated, i.e., be freed of wetting water.

Wetting and encasing generally can take place on granulating plates, in granulate extruders, in granulating drums and other known apparatus.

In the following examples the sodium percarbonate is present in a revolving drum and is wet in a first process step with water or aqueous sodium silicate solution and in a second process step is encased with a sodium perborate dust which contains at least 15% active oxygen or with such dust and the water binding material when such was employed.

The amount of sodium perborate which is necessary for adherence is determined by a preliminary test.

The necessary water brought in for the encasing, as stated, can be entirely or partially removed again by known drying processes. However, it is also possible to let this wetting water to engage from the perborate jacket in a subsequent step. The tetrahydrate step should not be reached thereby. The outer jacket of the percarbonate particles accordingly consists of either entirely or partially dewatered sodium perborate or entirely or partially dehydrated sodium perborate and sodium silicate with or without the water binding agent.

The degree of stability in moist atmosphere is demonstrated by the following stability test:

A first series of tests with the test products of Examples 1–3, namely, with 2–26% $B_2O_3$ (Test 1), 3.92% $B_2O_3$ (Test 2) and 7.14% $B_2O_3$ (Test 3), the sodium percarbonate starting product and sodium perborate tetrahydrate as standard and a second series of tests with the test products of Examples 4–6, namely, with 4.18% $B_2O_3$ and 0.05% $SiO_2$ (Test 4), 4.18% $B_2O_3$ and 0.43% $SiO_2$ (Test 5) and 4.18% $B_2O_3$ and 0.93 $SiO_2$ (Test 6), the sodium percarbonate starting product and sodium perborate tetrahydrate as standard were weighed, in each case about 2 grams in open weighing glasses (diameter=35 mm, height=30 mm).

All samples of a series of tests were placed in a desiccator (diameter=150 mm, height=150 mm), in which 670 ml of 10.56% sulfuric acid were present and stored in an incubator at +30° C. for 4 days. Two further desiccators, one for each series of experiments with the same filling of samples were stored 7 and 10 days at +30° C. in the incubator.

Through the sulfuric acid present in the desiccators a 96% relative air humidity was maintained. After the end of the tests the entire contents of each test glass were analyzed.

The stability method shows that compared to the sodium percarbonate not encased with dehydrated perborate or dehydrated perborate and sodium silicate there was reached a higher active oxygen stabilization although already after 4 days more water was taken up from the test products than is required for sodium perborate hydration. The same stability tests showed that the products of Examples 7–10 with the sodium percarbonate encased in dehydrated sodium perborate, sodium silicate and water binding agent had a higher active oxygen stabilization than unencased sodium percarbonate.

In a washing agent as a rule that is not the case because the water taken up on the surface of hygroscopic perborate is bound by the simultaneous presence of still hydratable sodium perborate.

If the jacket of the sodium percarbonate consists of dehydrated sodium perborate with at least 15% active oxygen, the active oxygen and the high speed of solution of the sodium percarbonate does not change disadvantageously because sodium perborate with at least 15% active oxygen likewise via a high speed of solution (according to temperature in the range of ½ minute to a few seconds) is available, i.e., the ratio of sodium percarbonate to dehydrated sodium perborate is at sufficient dissolving volume without significant influence on the active oxygen content and the dissolving behavior of the perborate encased sodium percarbonate.

If the jacket of the sodium percarbonate consists of dehydrated sodium perborate and sodium silicate, the active oxygen is slightly lower compared to the starting sodium percarbonate, the dissolving time increased and the stability in moist warm atmosphere substantially increased.

It was surprising that the combination of sodium perborate and sodium percarbonate, namely, which is essential, would be possible in the presence of moisture since those skilled in the art had basically avoided this because they were afraid of the known decomposition reactions.

The same packages, bins, trucks and mechanical transportation apparatus can be used for the sodium percarbonate particles of the invention as for sodium perborate tetrahydrate, i.e., these sodium percarbonate particles are a replacement for sodium perborate tetrahydrate.

The following abbreviations are employed;
NaPc = sodium percarbonate
NaPb = sodium perborate
Oa = active oxygen
kg/l = kilograms/liter When an inert material is employed, the amount X of inert material is found by the following calculation example assuming the applied water is 100% removed.

(1) 100 g NaPc (14% Oa) + 5 g dewatered NaPb (15% Oa) + xg Oa free compound = yg (10% Oa)
14 g Oa + 0.75 g Oa = 14.75 g Oa
10% (y) = 14.75 g Oa
100% (y) = 147.5 g (2)

(2) in (1) inserted:
100 g NaPc + 5 g dehydrated NaPb + xg Oa free compound = 147.5 g x = 42.5 g Oa free compound i.e., 100 grams NaPc (14% Oa) can be encased with 42.5 grams of inert material, that is, 28.8% based on the NaPc particles obtained with 10% active oxygen. Of this 28.8% there is accordingly an amount of sodium silicate corresponding to 0.05-5% $SiO_2$ (see page 7 lines 16 to 19) and the remainder is water binding materials chemically inert to NaPc and dewatered NaPb.

Based on the NaPc (14% Oa) employed there can be added 42.5% Oa free compound, until, e.g., a sodium percarbonate particle with 10% active oxygen is obtained.

As water binding materials according to the invention there can be used sodium tripolyphosphate, calcined soda, water free sodium sulfate and sodium percarbonate dust.

They can be added individually or as mixtures. The $SiO_2$ content as stated above is 0.05-5 weight % in the finished particle.

Likewise, as stated above, there can be produced the encasing layer using a dehydrated sodium perborate with an active oxygen content of at least 15%.

The wetting with a sodium silicate solution is carried out according to the mixing apparatus used (revolving drum, granulating screw, granulating plate) and its degree of intensity of mixing by spraying or free jets, e.g., in a revolving drum by spraying or in a granulating screw by allowing it to flow in directly based on the intensity of intermixing. The water binding materials chemically inert to sodium percarbonate and dehydrated sodium perborate are applied in solid form to the NaPc particles wet with sodium silicate solution, preferably in finely divided form. The NaPc is added most preferably in dust form for the encasing. However, it is also possible to wet the NaPc with water and to apply the sodium silicate in solid form mixed with dehydrated NaPb (sodium perborate) and water binding materials to the wet NaPc to be encased, but this mixture should be as homogeneous as possible.

In all cases, even in using an aqueous sodium silicate solution, there should only be present sufficient water that the sodium percarbonate particles present are wet and that there can take place the highest possible coating with dehydrated sodium perborate or perborate and a sodium silicate and one or more water binding, chemically inert materials.

When the encasing layer consists essentially of dehydrated sodium perborate and sodium silicate generally the dehydrated sodium perborate is 14 to 83% of the total of dehydrated sodium perborate and sodium silicate.

When the encasing layer consists essentially of dehydrated sodium perborate, sodium silicate and a water binding material generally the dehydrated sodium perborate is 5 to 80%, the sodium silicate is 0,1 to 10% and the water binding material is 15 to 90%, the total of all three components of the encasing layer being 100%.

Unless otherwise indicated, all parts and percentages are by weight.

The composition can comprise, consist essentially of or consist of the materials set forth. Most preferably, the composition consists essentially of or consists of such materials. The process can comprise, consist essentially of or consist of the steps set forth.

The invention will be further explained in the following examples.

DESCRIPTION OF THE PREFERRED EMBODIMENTS

EXAMPLE 1

In a revolving drum (diameter = 250 mm, height = 250 mm), which at the same intervals contained four driving ribs 15 mm in width, there were present at a pitch of 15° and a rotating speed of 30 rpm, 1,140 grams of sodium percarbonate. In the first process step inside of 1 minute and 5 seconds 46 grams of water were sprayed on through a binary nozzle. Directly thereafter 45 grams of dehydrated sodium perborate dust were fed in by hand with a shovel within 8 minutes and 23 seconds.

The following process steps were then carried out:

| Process Step No. | Dehydrated NaPb-Dust Addition g | Water Addition g | Time min/sec |
| --- | --- | --- | --- |
| 3 | — | 20 | 38″ |
| 4 | 10 | — | 4′ |
| 5 | — | 10 | 21″ |
| 6 | 5 | — | 3′ |

After the last process step the test product was dried in a drying cabinet at 55°–60° C. for about 30 minutes. Analytical results are given in Table No. 1 below.

EXAMPLE 2

As described in Example 1 there were present in a revolving drum at a pitch of 15° and a rotating speed of 30 rpm 1,080 grams of sodium percarbonate. It was sprayed with water in the following process steps and encased with dehydrated sodium perborate dust.

| Process Step No. | Dehydrated NaPb-Dust Addition g | Water Addition g | Time min/sec |
| --- | --- | --- | --- |
| 1 | — | 43 | 54″ |
| 2 | 38 | — | 7′ |
| 3 | — | 20 | 27″ |
| 4 | 18 | — | 5′ |
| 5 | — | 20 | 35″ |
| 6 | 17 | — | 5′ |
| 7 | — | 20 | 28″ |
| 8 | 17 | — | 4′ 20″ |
| 9 | — | 20 | 28″ |
| 10 | 20 | — | 6′ |
| 11 | — | 10 | 16″ |
| 12 | 10 | — | 3′ |

After the last process step the test product was dried in a drying cabinet at 55°–60° C. for about 45 minutes. Analytical date are shown in Table 1.

EXAMPLE 3

As described in Example 1, there were present in a revolving drum at a pitch of 15° and a rotating speed of 30 rpm, 960 grams of sodium percarbonate and they were sprayed with water in the following process steps and encased in dehydrated sodium perborate dust.

| Process Step No. | Dehydrated NaPb-Dust Addition g | Water Addition g | Time min/sec |
| --- | --- | --- | --- |
| 1 | — | 39 | 62″ |
| 2 | 33 | — | 7′ |
| 3 | — | 20 | 37″ |
| 4 | 23 | — | 5′ |
| 5 | — | 20 | 36″ |
| 6 | 22 | — | 5′ |
| 7 | — | 20 | 37″ |
| 8 | 29 | — | 7′ |
| 9 | — | 20 | 36″ |
| 10 | 23 | — | 6′ |
| 11 | — | 20 | 36″ |
| 12 | 24 | — | 5′ |
| 13 | — | 20 | 36″ |
| 14 | 24 | — | 5′ |
| 15 | — | 20 | 36″ |
| 16 | 22 | — | 5′ |
| 17 | — | 20 | 35″ |
| 18 | 21 | — | 4′ |
| 19 | — | 20 | 34″ |
| 20 | 19 | — | 3′ |
| 21 | — | 20 | 35″ |

After the last process step the test product was dried in a drying cabinet at 55°–60° C. for about 60 minutes. Analytical data are shown in Table 1.

EXAMPLE 4

As described in Example 1, there were present in a revolving drum at a pitch of 15° C. and a rotating speed of 30 rpm 1080 grams of sodium percarbonate and they were sprayed in the following process steps with 136 ml of waterglass solution (containing 4.5 grams of waterglass 36° Baume) and encased with dehydrated sodium perborate dust.

| Process Step No. | Dehydrated NaPb-Dust Addition g | Waterglass Addition ml | Time min/sec |
| --- | --- | --- | --- |
| 1 | — | 43 | 72″ |
| 2 | 45 | — | 9′ |
| 3 | — | 20 | 38″ |
| 4 | 17 | — | 4′ |
| 5 | — | 20 | 38″ |
| 6 | 17 | — | 3′ 30″ |
| 7 | — | 20 | 38″ |
| 8 | 19 | — | 4′ 30″ |
| 9 | — | 20 | 36″ |
| 10 | 15 | — | 4′ 30″ |
| 11 | — | 13 | 30″ |
| 12 | 7 | — | 3′ |

After the last process step the test product was dried in a drying cabinet at 55°–60° C. for about 60 minutes. Analytical data are shown in Table 2.

EXAMPLE 5

As described in Example 1 there were present in a revolving drum at a pitch of 15° and a rotating speed of 30 rpm 1080 grams of sodium percarbonate and sprayed in the following process steps with 138 ml of waterglass solution (containing 20.4 grams of waterglass 36° Baume) and in process step 13 sprayed with 15 ml of water and encased with dehydrated sodium perborate dust.

| Process Step No. | Dehydrated NaPb-Dust Addition g | Waterglass Addition ml | Time min/sec |
| --- | --- | --- | --- |
| 1 | — | 43 | 78″ |
| 2 | 32 | — | 6′ 30″ |
| 3 | — | 20 | 58″ |
| 4 | 15 | — | 4′ |
| 5 | — | 20 | 50″ |
| 6 | 12 | — | 3′ 30″ |
| 7 | — | 20 | 50″ |
| 8 | 16 | — | 4′ |
| 9 | — | 20 | 45″ |
| 10 | 28 | — | 5′ 30″ |
| 11 | — | 15 | 65″ |
| 12 | 12 | — | 3′ |
| 13 | — | 15 (water) | 60″ |
| 14 | 5 | — | 3′ |

After the last process step the test product was dried in a drying cabinet at 55°–60° C. for about 60 minutes. Analytical data are shown in Table 2.

EXAMPLE 6

As described in Example 1 there were present in a revolving drum at a pitch of 15° and a rotating speed of 30 rpm 1080 grams of sodium percarbonate and sprayed in the following process steps with 130 ml of waterglass solution (containing 40.8 grams of waterglass 36° Baume) and in process steps 13 and 15 sprayed with 40 ml of water and encased with dehydrated sodium perborate dust.

| Process Step No. | Dehydrated NaPb-Dust Addition g | Waterglass Addition ml | Time min/sec |
|---|---|---|---|
| 1 | — | 43 | 76" |
| 2 | 16 | — | 4' |
| 3 | — | 20 | 54" |
| 4 | 16 | — | 4' |
| 5 | — | 20 | 62" |
| 6 | 17 | — | 5' |
| 7 | — | 20 | 41" |
| 8 | 15 | — | 6' 30" |
| 9 | — | 20 | 1' 35" |
| 10 | 22 | — | 6' |
| 11 | — | 20 | |
| 12 | 17 | — | 7' |

-continued

| Process Step No. | Dehydrated NaPb-Dust Addition g | Waterglass Addition ml | Time min/sec |
|---|---|---|---|
| 13 | — | 20 (water) | 33" |
| 14 | 17 | — | 6' 30" |
| 15 | — | 20 (water) | 35" |

After the last process step the test product was dried in a drying cabinet at 55°–60° C. for about 60 minutes. Analytical data are shown in Table 2.

TABLE 1

| | Starting Product | | | Test Product | | |
|---|---|---|---|---|---|---|
| | Standard NaPb-Tetrahydrate | Dehydrated NaPb Dust | NaPc | Example 1 | Example 2 | Example 3 |
| Active Oxygen (Oa) % | 10.20 | 15.56 | 13.60 | 13.45 | 13.57 | 13.76 |
| $Na_2O$ % | 20.38 | 31.19 | 38.51 | 38.75 | 38.10 | 37.34 |
| $B_2O_3$ % | 22.77 | 34.73 | — | 2.26 | 3.92 | 7.14 |
| $CO_2$ % | — | — | 27.33 | 26.25 | 24.94 | 22.28 |
| $Fe_2O_3$ % | 0.0004 | 0.0007 | 0.002 | — | — | — |
| Dissolving Time (minutes) | 7.2 | 0.3 | 0.85 | 1.3 | 0.9 | 1.1 |
| Bulk Density kg/l | 0.760 | 0.500 | 0.930 | 0.910 | 0.880 | 0.830 |
| Sieve Analysis on: | | | | | | |
| 0.8 mm % | 0 | 0 | 0 | 0 | 1 | 1 |
| 0.5 mm % | 35 | 0 | 38 | 1 | 49 | 41 |
| 0.4 mm % | 17 | 0 | 18 | 23 | 21 | 21 |
| 0.2 mm % | 43 | 8 | 32 | 33 | 26 | 25 |
| 0.1 mm % | 4 | 20 | 11 | 3 | 3 | 3 |
| Residue % | 1 | 72 | 1 | 0 | 0 | 0 |
| Oa-decomposition | | | | | | |
| 4 days. % at + 30° C. and | 0.6 | — | 19 | 17 | 13 | 14 |
| after 7 days. % 96% rel. atmospheric moisture | 0.8 | — | 47 | 42 | 30 | 36 |
| after 10 days. % | 1.2 | — | 86 | 79 | 67 | 51 |

TABLE 2

| | Starting Product | | | Test Product | | |
|---|---|---|---|---|---|---|
| | Standard NaPb-Tetrahydrate | Dehydr. NaPb Dust | NaPc | Example 4 | Example 5 | Example 6 |
| Active Oxygen (Oa) % | 1.20 | 15.56 | 13.60 | 13.46 | 13.20 | 13.14 |
| $Na_2O$ % | 20.38 | 31.19 | 38.51 | 37.16 | 36.70 | 36.97 |
| $B_2O_3$ % | 22.77 | 34.73 | — | 4.18 | 4.18 | 4.18 |
| $CO_2$ % | — | — | 17.33 | 24.10 | 23.80 | 24.12 |
| $SiO_2$ % | — | — | 0.01 | 0.05 | 0.43 | 0.93 |
| $Fe_2O_3$ % | 0.0004 | 0.0007 | 0.002 | — | — | — |
| Dissolving Time (minutes) | 7.2 | 0.3 | 0.85 | 1.9 | 4.3 | 5.9 |
| Bulk Density kg/l | 0.760 | 0.500 | 0.930 | 0.840 | 0.860 | 0.810 |
| Sieve Analysis on: | | | | | | |
| 0.8 nn % | 0.0 | 0 | 0 | 0 | 0 | 1 |
| 0.5 mm % | 35 | 0 | 38 | 51 | 55 | 57 |
| 0.4 mm % | 17 | 0 | 18 | 22 | 20 | 20 |
| 0.2 mm % | 43 | 8 | 32 | 25 | 22 | 20 |
| 0.1 mm % | 4 | 20 | 11 | 2 | 2 | 2 |
| Residue % | 1 | 72 | 1 | 0 | 0 | 0 |
| Oa-decomposition | | | | | | |
| after 4 days % at + 30° C. and | 0. | — | 26 | 15 | 6 | 1.5 |
| after 7 days % 96% rel. atmospheric moisture | 0.08 | — | 63 | 33 | 12 | 5 |
| after 10 days % | 0.10 | — | 54 | 28 | 11 | |

DETERMINATION OF THE DISSOLVING SPEED (CONDUCTIVE METHOD)

There were supplied to a double jacketed container having a diameter of 90 mm and cooled by a thermostat to 15° C. 500 ml of distilled water and stirred with a four blade glass stirrer (blade length 40 mm, blade height 10 mm) which was spaced 5 mm from the bottom at a revolution rate of 320–340 rpm until the water likewise had a temperature of 15° C. In addition to the stirrer there was located at approximately half the height of the liquid surface an immersion measuring cell for measuring the conductivity. The measuring cell was connected to a conductoscope E 365.

While the two compensation potentiometers of the conductoscope are at zero a measuring range of 1 ms is set. With the aid of the two laterally fitted potentiometers the indicator of the measuring instrument is set for 0 or 100 scale parts. In this way the conductoscope is prepared for measuring.

The potentiograph E 336 connected to the conductoscope is set to a range of 1000 mV. With the help of the zero point potentiometer on the recorder and a correction potentiometer in the conductoscope the potentiograph is set that it indicates the value measured synchronously with the conductoscope. After placing the recording paper and adjusting the paper feed the time marking is set. As soon as the time mark is affixed there is added 1 gram of percarbonate while simultaneous placing the switch on for the titration in the water. The initial quick increase of the conductivity then continuously decreases. When all the percarbonate dissolves the pencil writes a line parallel to the edge of the paper. The paper feed is then stopped and the two writing pencils taken off the paper.

With a pipette there is withdrawn 25 ml of the solution which is replaced by distilled water. In the original volume there is now found only 95% of the dissolved salts. The newly set conductivity value is recorded by a straight line through the curve. A perpendicular to the time marking is obtained from the point of intersection and the value read off.

EXAMPLE 7

As described in Example 1 there were present in a revolving drum at a pitch of 15° and a rotating speed of 30 rpm 745.5 grams of sodium percarbonate and in the following process steps they were sprayed with 210 ml of waterglass solution (containing 65.9 grams of waterglass 36° Baume) and encased with a homogeneous mixture consisting of 316 grams $Na_2SO_4$ and 120 grams dehydrated NaPb:

| Process Step No. | Addition of Mixture of Dehydrated Dust and Waterfree $Na_2SO_4$ g | Waterglass Addition ml |
| --- | --- | --- |
| 1 | — | 30 |
| 2 | 59 | — |
| 3 | — | 30 |
| 4 | 86 | — |
| 5 | — | 30 |
| 6 | 77 | — |
| 7 | — | 30 |
| 8 | 63 | — |
| 9 | — | 40 |
| 10 | 96 | — |
| 11 | — | 40 |
| 12 | 55 | — |
| 13 | — | 10 |

After the last process step the test product was dried in the drying cabinet at 55°–60° C. for about 1 hour.
Analytical data is set forth in Table 3.

EXAMPLE 8

As described in Example 7 there were present in a revolving drum at a pitch of 15° and in the rotating speed of 30 rpm 745.5 grams of sodium percarbonate and in the following process steps they were sprayed with 260 ml of waterglass solution (containing 81.6 grams of waterglass 36° Baume) and encased with a homogeneous mixture consisting of 333 grams of sodium tripolyphosphate and 120 grams of dehydrated sodium perborate:

| Process Step No. | Addition of Mixture of Dehydrated Dust and Na-tripolyphosphate g | Waterglass Addition ml |
| --- | --- | --- |
| 1 | — | 30 |
| 2 | 58 | — |
| 3 | — | 50 |
| 4 | 108 | — |
| 5 | — | 50 |
| 6 | 100 | — |
| 7 | — | 50 |
| 8 | 70 | — |
| 9 | — | 50 |
| 10 | 44 | — |
| 11 | — | 30 |
| 12 | 73 | — |

After the last process step the test product was dried in a drying cabinet at 55°–60° C. for about 1 hour.
Analytical data is set forth in Table 3.

EXAMPLE 9

As described in Example 7 there were present in a revolving drum at a pitch of 15° and a rotating speed of 30 rpm 745.5 grams of sodium percarbonate and in the following process steps they were sprayed with 540 ml of waterglass solution (containing 169.5 grams of waterglass 36° Baume) and encased with a homogeneous mixture consisting of 324 grams of calcined soda and 120 grams of dehydrated sodium perborate:

| Process Step No. | Addition of Mixture of Dehydrated NaPb Dust and Calcined Soda g | Waterglass Addition ml |
| --- | --- | --- |
| 1 | — | 30 |
| 2 | 20 | — |
| 3 | — | 30 |
| 4 | 28 | — |
| 5 | — | 40 |
| 6 | 35 | — |
| 7 | — | 40 |
| 8 | 29 | — |
| 9 | — | 40 |
| 10 | 33 | — |
| 11 | — | 40 |
| 12 | 32 | — |
| 13 | — | 40 |
| 14 | 33 | — |
| 15 | — | 40 |
| 16 | 20 | — |
| 17 | — | 50 |
| 18 | 68 | — |
| 19 | — | 50 |
| 20 | 32 | — |
| 21 | — | 50 |
| 22 | 74 | — |
| 23 | — | 50 |
| 24 | 40 | — |
| 25 | — | 40 |

After the last process step, it was dried in a drying cabinet at 55°-60° C. for about 1 hour.

Analytical data is set forth in Table 3.

EXAMPLE 10

As described in Example 7 there were present in a revolving drum at a pitch of 15° and a rotating speed of 30 rpm 960 grams of sodium percarbonate and in the following process steps it was sprayed with 130 ml of waterglass solution (containing 36.2 grams of waterglass 36° Baume) and encased with a homogeneous mixture consisting of 60 grams of dehydrated NaPb dust and 180 grams of NaPc dust:

| Process Step No. | Addition of Mixture of Dehydrated NaPb Dust + NaPc Dust g | Waterglass Addition ml |
| --- | --- | --- |
| 1 | — | 40 |
| 2 | 68 | — |
| 3 | — | 24 |
| 4 | 37 | — |
| 5 | — | 24 |
| 6 | 40 | — |
| 7 | — | 22 |
| 8 | 41 | — |
| 9 | — | 20 |
| 10 | 54 | — |

After the last process step, the test product was dried in a drying cabinet at 55°-60° C. for about 60 minutes.

Analytical data is set forth in Table 3.

free sodium sulfate, sodium percarbonate dust and mixture thereof.

2. Sodium percarbonate particles according to claim 1 wherein the active oxygen content is at least 10.2%.

3. Sodium percarbonate particles according to claim 1 wherein the encasing layer consists essentially of:
 (a) dehydrated sodium perborate
 (b) a mixture of dehydrated sodium perborate and sodium silicate containing 14 to 83% of the dehydrated sodium perborate based on the total of the two materials, or
 (c) a mixture of 5 to 80% dehydrated sodium perborate, 0.1 to 10% of the sodium silicate and 15 to 90% of the water binding agent based on the total of all three components.

4. The process of claim 1 including the step of at least partially removing the applied water.

5. Sodium percarbonate particles according to claim 1 consisting essentially of a sodium percarbonate nucleus and an encasing layer consisting essentially of said dehydrated sodium perborate.

6. A process for the production of the particles of claim 5 consisting essentially of coating water wet sodium percarbonate with dehydrated sodium perborate containing less than 54 grams of water per mole.

7. Sodium percarbonate particles according to claim 1 consisting essentially of a sodium percarbonate nucleus and an encasing layer consisting essentially of said dehydrated sodium perborate and sodium silicate.

8. Sodium percarbonate particles according to claim

TABLE 3

| | Standard | Starting Materials | | | | Test Product | | | |
| --- | --- | --- | --- | --- | --- | --- | --- | --- | --- |
| | NaPb-Tetra-hydrate | Dehydrated NaPb-Dust | NaPc-Starting Value | NaPc-Dust | Na-tri-poly-phosphate | Example 7 | Example 8 | Example 9 | Example 10 |
| Active Oxygen (Oa) % | 10.20 | 15.56 | 13.20 | 12.92 | — | 9.8 | 9.0 | 9.0 | 13.16 |
| $Na_2O$ % | 20.38 | 31.19 | 38.51 | | — | 29.8 | 21.8 | 42.2 | 37.63 |
| $B_2O_3$ % | 22.77 | 34.73 | — | — | — | 10.2 | 4.6 | 3.6 | 2.18 |
| $CO_2$ % | — | — | 27.33 | | — | 15.0 | 15.4 | 27.5 | 25.23 |
| $SO_3$ % | 0.041 | 0.076 | 0.07 | 0.07 | — | — | 17.5 | — | |
| $SiO_2$ % | 0.002 | 0.003 | 0.01 | | — | 1.8 | 1.3 | 3.6 | 0.98 |
| $P_2O_5$ % | 0.003 | 0.003 | 0.58 | | 58.9 | 17.6 | — | — | |
| Bulk Density kg/l | 0.760 | 0.500 | 0.930 | 0.890 | 0.680 | 0.950 | 0.770 | 0.600 | 0.920 |
| Sieve Analysis on: | | | | | | | | | |
| 0.8 mm % | 0 | 0 | 0 | 0 | 0 | 1 | 3 | 2 | 0 |
| 0.5 mm % | 35 | 0 | 38 | 0 | 1 | 40 | 45 | 51 | 36 |
| 0.5 mm % | 17 | 0 | 18 | 0 | 4 | 15 | 15 | 16 | 18 |
| 0.2 mm % | 43 | 8 | 32 | 1 | 30 | 23 | 25 | 25 | 27 |
| 0.1 mm % | 4 | 20 | 11 | 62 | 38 | 14 | 8 | 5 | 16 |
| Residue % | 1 | 72 | 1 | 37 | 27 | 7 | 4 | 1 | 3 |
| Oa-decomposition after 4 days. % at + 30° C. and | 0 | — | 37 | — | — | 6 | 18 | 4 | 8 |
| after 7 days. % 96% rel. air humidity | 0.1 | — | 94 | — | — | 7 | 26 | 12 | 19 |
| after 10 days. % | 0.3 | — | 99 | — | — | 24 | 40 | 20 | 31 |

What is claimed is:

1. Sodium percarbonate particles consisting of essentially a sodium percarbonate nucleus and an encasing layer consisting essentially of (1) dehydrated sodium perborate containing less than 54 grams of water per mole, (2) dehydrated sodium perborate containing less than 54 grams of water per mole and sodium silicate, or (3) dehydrated sodium perborate containing less than 54 grams of water per mole, sodium silicate and a water binding material chemically inert to sodium percarbonate and said dehydrated sodium perborate, said water binding material being selected from the group consisting of sodium tripolyphosphate, calcined soda, water 7 wherein the amount of sodium silicate is such as to provide an $SiO_2$ content of 0.05 to 5% in the particles.

9. Sodium percarbonate particles according to claim 7 wherein the sodium silicate is selected from the group consisting of sodium metasilicate, sodium disilicate, sodium ortho silicate and waterglass.

10. A process for the production of the particles of claim 7 consisting essentially of coating sodium percarbonate particles wet with an aqueous sodium silicate solution with dehydrated sodium perborate containing less than 54 grams of water per mole.

11. A process for the production of the particles of claim 7 consisting essentially of coating sodium percarbonate particles wet with water with a mixture of dehydrated sodium perborate containing less than 54 grams of water per mole and sodium silicates.

12. Sodium percarbonate particles according to claim 1 consisting essentially of a sodium percarbonate nucleus and an encasing layer consisting essentially of (1) said dehydrated sodium perborate or (2) said dehydrated sodium perborate and sodium silicate, the total content of active oxygen in the particles being 11 to 15.5%.

13. Sodium percarbonate particles according to claim 12 wherein the encasing layer is (2) and the sodium silicate is sodium meta silicate or waterglass.

14. Sodium percarbonate particles according to claim 12 having a total active oxygen content of at least 15%.

15. Sodium percarbonate particles according to claim 1 wherein the encasing layer is (3).

16. A process for preparing the product of claim 15 consisting essentially of wetting the sodium percarbonate nucleus with aqueous sodium silicate solution and then applying a solid mixture of dehydrated sodium perborate containing less than 54 grams of water per mole and said water binding material to the wet sodium percarbonate.

17. Sodium percarbonate particles according to claim 15 wherein there is a total active oxygen content of 8 to 15%.

18. Sodium percarbonate particles according to claim 17 wherein the amount of sodium silicate is such as to provide an $SiO_2$ content of 0.05 to 5% in the particles.

19. Sodium percarbonate particles according to claim 18 wherein the water binding material is sodium percarbonate.

20. Sodium percarbonate particles according to claim 18 wherein the water binding material is sodium tripolyphosphate.

21. Sodium percarbonate particles according to claim 18 wherein the encasing layer is made from the dehydrated sodium perborate, waterglass and sodium percarbonate dust.

22. Sodium percarbonate particles according to claim 18 wherein the dehydrated sodium perborate has an active oxygen content of at least 15%.

23. Sodium percarbonate particles according to claim 18 wherein the water binding material is calcined soda.

24. Sodium percarbonate particles according to claim 18 wherein the water binding material is sodium sulfate.

* * * * *